United States Patent
Lee et al.

(10) Patent No.: US 7,636,454 B2
(45) Date of Patent: Dec. 22, 2009

(54) METHOD AND APPARATUS FOR OBJECT DETECTION IN SEQUENCES

(75) Inventors: Sangkeun Lee, Irvine, CA (US); Ning Xu, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 693 days.

(21) Appl. No.: 11/398,103

(22) Filed: Apr. 4, 2006

(65) Prior Publication Data

US 2007/0127819 A1    Jun. 7, 2007

Related U.S. Application Data

(60) Provisional application No. 60/742,695, filed on Dec. 5, 2005.

(51) Int. Cl.
*G06K 9/00* (2006.01)
*H04N 5/225* (2006.01)
*G06K 9/46* (2006.01)

(52) U.S. Cl. ............ 382/103; 348/169; 382/190

(58) Field of Classification Search ............ 382/103, 382/107, 190, 260, 266, 218; 348/143, 169, 348/170, 171, 172, 94, 152, 154, 155, 208.1, 348/208.2, 715

See application file for complete search history.

(56) References Cited

U.S. PATENT DOCUMENTS

| | | | | |
|---|---|---|---|---|
| 5,974,192 | A * | 10/1999 | Kundu | 382/260 |
| 6,445,832 | B1 * | 9/2002 | Lee et al. | 382/266 |
| 7,085,401 | B2 * | 8/2006 | Averbuch et al. | 382/103 |
| 2005/0128291 | A1 * | 6/2005 | Murakami | 348/143 |

* cited by examiner

*Primary Examiner*—Abolfazl Tabatabai
(74) *Attorney, Agent, or Firm*—Kenneth L. Sherman, Esq.; Michael Zarrabian, Esq.; Myers Andras Sherman LLP (57) ABSTRACT

A method and apparatus for detecting and locating objects of interest in video sequences is provided. A frame is defined as an image belonging to video sequences. Each frame with the same or different size of original input sequences is searched by the same or different size window efficiently for detecting objects. The characteristics of temporal redundancies in video sequences are used in detecting objects in video sequences.

20 Claims, 7 Drawing Sheets

METHOD AND APPARATUS FOR OBJECT DETECTION IN SEQUENCES

RELATED APPLICATIONS

This application claims priority under 35 USC 119(e) of provisional patent application Ser. No. 60/742,695, filed on Dec. 5, 2005, incorporated herein by reference in its entirety.

FIELD OF THE INVENTION

The present invention relates generally to detecting or locating objects in images, and more particularly to detecting objects in captured video sequences.

BACKGROUND OF THE INVENTION

In video image processing, detecting and locating objects is an essential pre-processing step for object recognition in computer vision and image processing applications. For example, the human face is an important subject in image and video databases, because it is a unique feature of human beings and is ubiquitous in photos, news, video, and documentaries.

Faces can be used to index and search images and video, classify video scenes, and segment human objects from the background. Face detection is performed to determine if there are any faces in an image and locate the position of each face. Such technique can be applied to any object which is interesting. Many researchers have focused on developing techniques for detecting and locating objects in an image and applying them to video sequences. However, such techniques do not consider temporal redundancies in detecting objects in video sequences.

BRIEF SUMMARY OF THE INVENTION

In one embodiment, the present invention provides a method and apparatus for detecting objects in video sequences. A frame is defined as an image belonging to video sequences. Each frame with the same or different size of original input sequences is searched by the same or different size window efficiently for detecting objects. The characteristics of temporal redundancies in video sequences are used in detecting objects in video sequences.

One object detection method according to the present invention includes detecting and locating objects in a video sequence using different sizes of windows sliding over consecutive input frames. Each sliding window during the same processing period has different window size. The sequence of different windows is repeatedly used to the corresponding consecutive frames.

Another object detection method according to the present invention includes detecting and locating objects in a video sequence using a fixed size window sliding over different sizes of consecutive frames in different time lines of video sequence. Each frame during the same processing period has different frame size. The sequence of different frame sizes is repeatedly used in relation to the corresponding consecutive frames coming in time with one sliding window.

Another object detection method according to the present invention includes detecting and locating objects in a video sequence using the first frame in processing period with different size windows. The rest of the frames in the processing period are replaced with the first frame.

Another object detection method according to the present invention includes detecting and locating objects in a video sequence using a sliding window with the different sizes of the first frame in the processing period. The rest of the frames in the processing period are replaced and resized according to the time line they reside in.

The present invention further provides an object detection apparatus (system) which implements the above example methods.

These and other features, aspects and advantages of the present invention will become understood with reference to the following description, appended claims and accompanying figures.

DETAILED DESCRIPTION OF THE INVENTION

In one embodiment the present invention provides an image processing method and system that provides the ability to detect and locate objects which are of interest in applications when video sequences (e.g., in a video stream) are provided.

Figure 1:
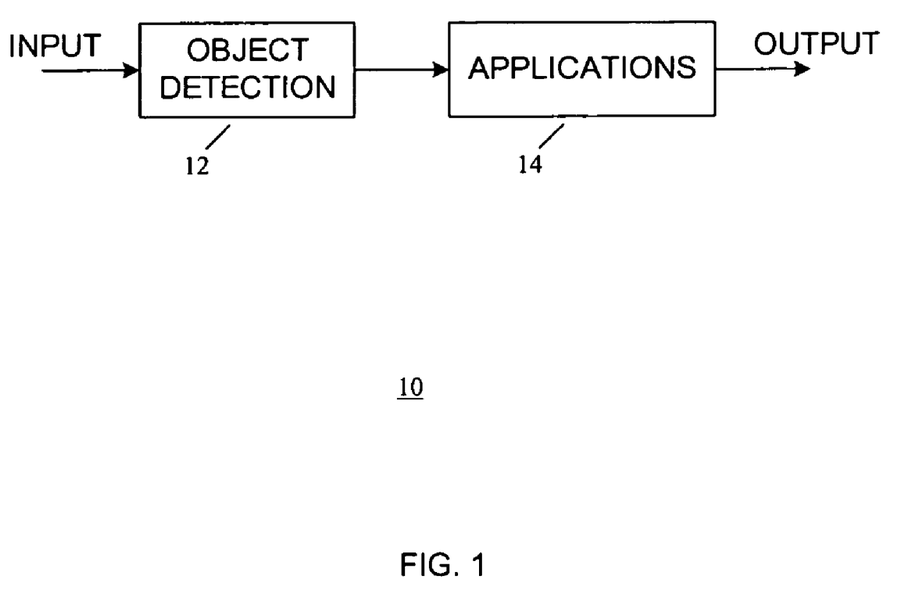
FIG. 1 shows an example functional block diagram of an embodiment of an image processing system including object detection, according to an embodiment of the present invention.

Referring now to FIG. 1, a scheme of the first example detection processing system 10 which implements an embodiment of the method of the present invention is now described. An image set comprising a video sequence is captured and digitized according to techniques well-known to generate input digital video sequence comprising a sequence of digital images. Each digital image in the digital video sequence is represented by a set of discrete areas referred to as pixels. Each digitized image is transformed into YUV space, wherein for each pixel, the value Y represents luminance, the value U represents a first color difference, and the value V represents a second color difference (i.e., each pixel is assigned a YUV value).

According to the preferred embodiments of the present invention described herein, the Y values of input images are input sequentially to an object detection unit 12 (FIG. 1) for locating objects to be used by an application unit 14. Output of the application unit 14 is transformed back to the original color space, or another color space as necessary.

Object detection involves searching the suspicious regions of an image to determine if the regions are of interest in object recognition. A basic procedure to find suspicious/interesting regions, is to slide a window along a pre-defined path (e.g., a scan-line direction) in the image, and compare the object features extracted from the original object with the features obtained within neighborhoods centered in the sliding window. The original object indicates a reference object that an application tries to find, i.e. a model, and the object features can be an image or a vector which depends on the application. The features can be same as the original reference model.

Several example methods to find objects efficiently in video sequences, according to the present invention, are described below. A frame corresponds to an image comprising a video sequence. In one example, it is assumed that a frame is very similar to its neighborhood (backward and forward in time line), and there is no scene change in the sequence.

A frame is defined as an image belonging to video sequences. Each frame with the same or different size of original input sequences (an image can be used as smaller size after down-sampling than the original size), is searched by the same window (where only one sized window is used in whole processing) or different size window efficiently for detecting objects. The characteristics of temporal redundancies in video sequences are used in detecting objects in video sequences.

Figure 2:
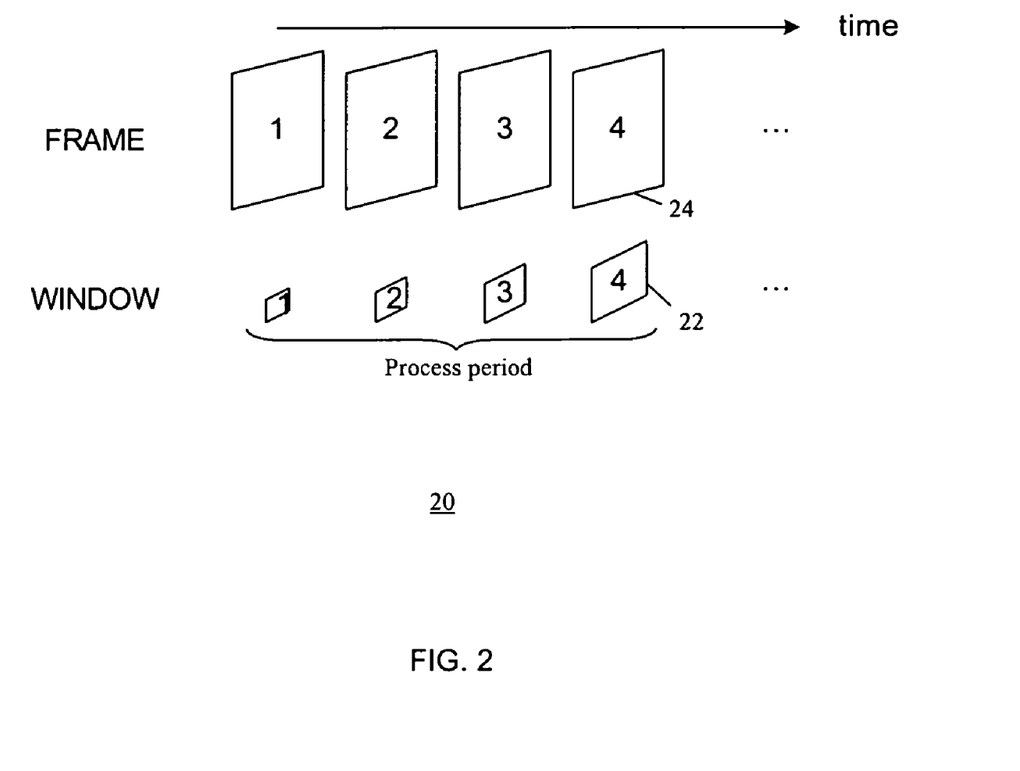
FIG. 2 shows a first example diagram of an image processing method including object detection using different size sliding windows on several consecutive frames for detecting objects, implemented in the system of FIG. 1, according to an embodiment of the present invention.

One object detection method according to the present invention includes detecting and locating objects in a video sequence using different sizes of windows sliding over consecutive input frames. Each sliding window during the same processing period has different window size. The sequence of different windows is repeatedly used to the corresponding consecutive frames. FIG. 2 shows an example method 20 for locating objects using different size sliding windows 22 (i.e., Windows 1, 2, 3, 4, etc.) over several consecutive frames 24 (i.e., Frames 1, 2, 3, 4, etc.).

At the first stage, the first frame (i.e., Frame 1) is scanned (searched) by a smallest window (i.e., Window 1 of size a×a). Measurements, which are defined to describe objects based on each application, are obtained from the windowed region in the frame. Said measurements depend on application, and the computation may be performed by extracting features predefined and summing up all the elements, for example, within the window.

Next, the measurement values are compared with pre-defined values about an object of interest (e.g., human face). For example, when an application finds human faces in a given image, first, predefined features about the face that are the shape of the face (e.g., ellipse), two holes for eyes, etc., are required. Next, extraction for those features within the windowed area in the given image is computed. Then, comparison between the predefined and obtained features is performed and similarities as a measurement can be calculated.

Then, based on the comparison, it is determined if the current windowed region includes the object of interest. If the windowed region includes the object, current region information is stored for later use. The result, i.e. location of an object, at the current frame can be used for processing (searching) the next frame since the difference from frame to frame is minor. For the next frame, the application does not have to search the location of the object found in the current frame to speed up the processing. The region including the object need not be processed any further since the next frame is very close to the current frame, and this information can speed up the process for the second stage.

At the second stage, the second frame (i.e., Frame 2) is processed by a window (i.e., Window 2 of size b×b) which is larger than the previous window (i.e., Window 1, wherein 0<a<=b). Measurements, which are defined to describe objects based on each application, are obtained from the windowed region in the frame. Next, the measurement values are compared with pre-defined values about an object of interest. Then, based on the comparison, it is determined if the current windowed region includes the object of interest. If the windowed region includes the object, current region information is stored for later use.

The purpose of increasing the window size is to cover all sizes of objects of interest. At this stage, in order to speed the process, the object locations determined by the previous stage are not processed. The information determined in this stage is also stored with the previous region location information for later use as described.

At a third stage the third frame (i.e., Frame 3) is processed by a window (i.e., Window 3 of size c×c) which is larger than the previous window (i.e., Window 2, wherein b<=c). Measurements, which are defined to describe objects based on each application, are obtained from the windowed region in the frame. Next, the measurement values are compared with pre-defined values about an object of interest. Then, based on the comparison, it is determined if the current windowed region includes the object of interest. If the windowed region includes the object, current region information is stored for later use as described.

Similarly, at a fourth stage the fourth frame (i.e., Frame 4) is processed by a window (i.e., Window 4 of size d×d) which is larger than the previous window (i.e., Window 3, wherein c<=d). Measurements, which are defined to describe objects based on each application, are obtained from the windowed region in the frame. Next, the measurement values are compared with pre-defined values about an object of interest. Then, based on the comparison, it is determined if the current windowed region includes the object of interest. If the windowed region includes the object, current region information is stored for later use as described.

The method then goes back to the first stage with same window sequences but new frames coming consecutively in time repeatedly. The number of frames should not exceed a threshold when it is taken into account that there may be large frame differences between frames. For example, the difference between frames may be large if there is fast motion of a large object. In the case of fast motion content sequences, the threshold should be small while slow motion sequences have a bigger threshold since the slow motion video consists of very similar frames.

Accordingly, at the first stage, a given frame in the process period is investigated by sliding window (the first window 22) to determine if there is a suspicious region for the object being targeted, and determined by calculating the measurements which are predefined. The locations of the targeted objects and other information, if any, are stored. Similarly, at the second stage, a frame after the first frame in the process period is searched by the second sliding window. However, the locations found at the previous stage (the first stage in this case) are not investigated at this stage because the frame difference between neighboring frames are assumed very small for saving process time. Further, the obtained result of locations and other information at this stage is added to the result of the previous stage. Similar procedures apply to the rest of stages (the third and fourth in window 20) in the process period.

Figure 3:
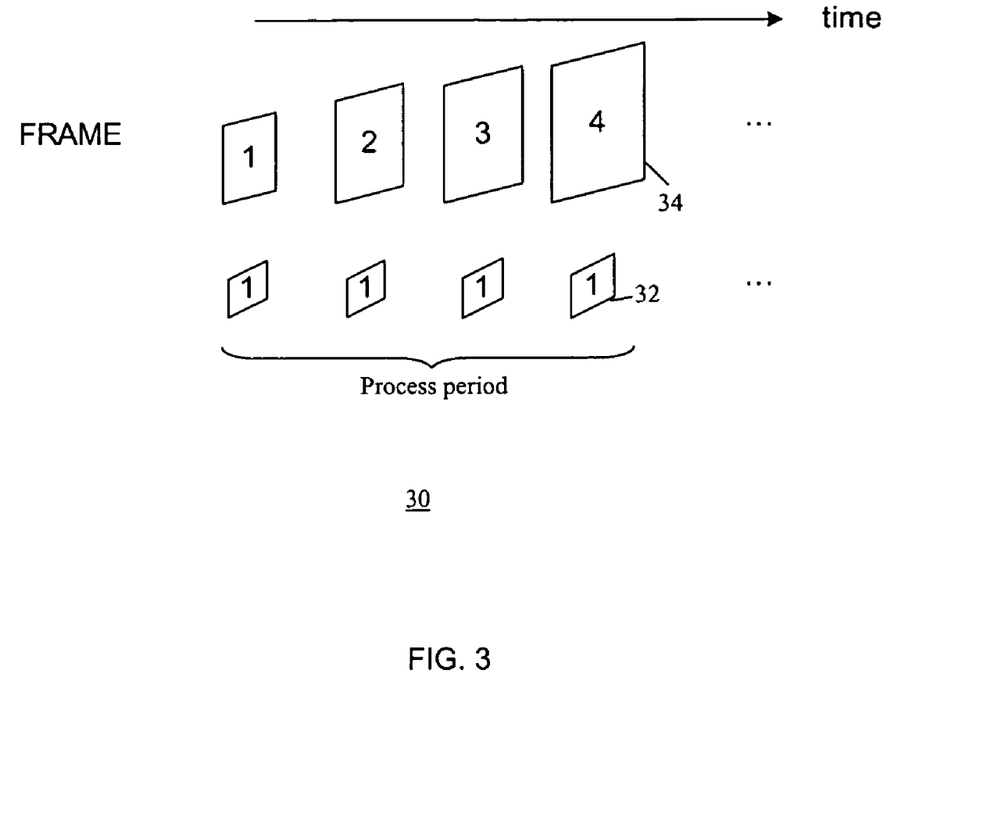
FIG. 3 shows a second example diagram of an image processing method including object detection using a fixed size sliding window on several different size consecutive frames for detecting objects, implemented in the system of FIG. 1, according to an embodiment of the present invention.
Figure 4:
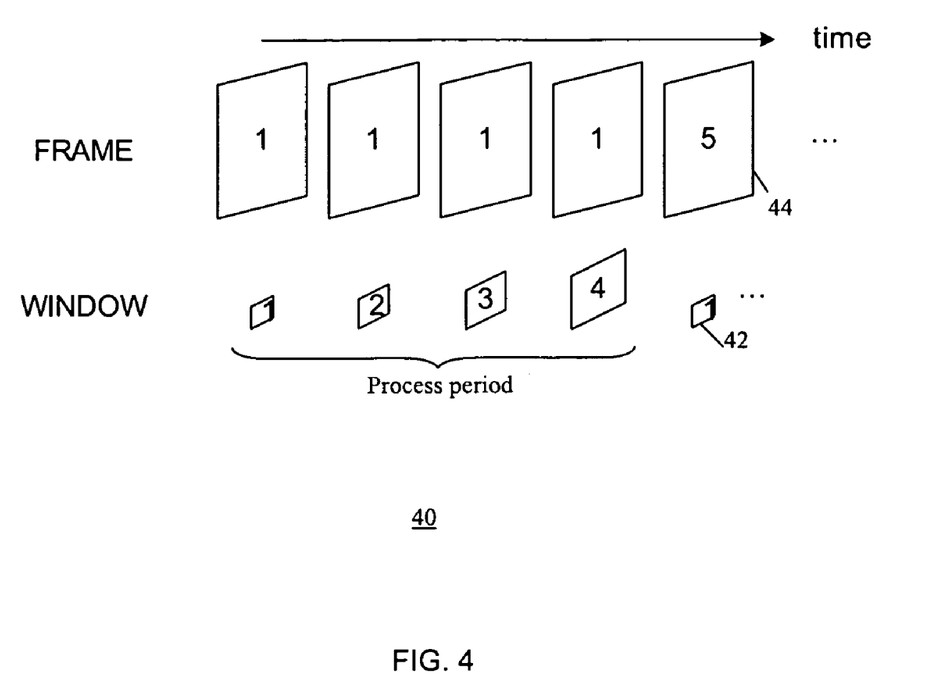
FIG. 4 shows a third example diagram of an image processing method including object detection using different size sliding windows on a fixed frame for detecting objects, implemented in the system of FIG. 1, according to an embodiment of the present invention.
Figure 5:
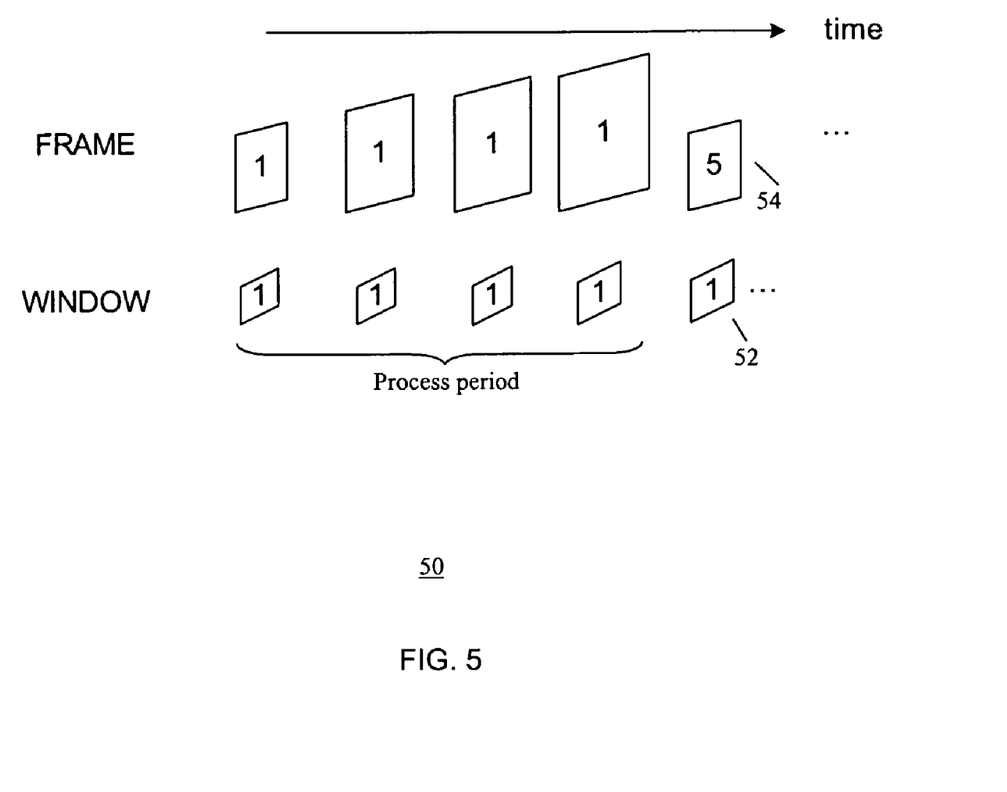
FIG. 5 shows a third example diagram of an image processing method including object detection using a fixed size sliding window on a different size frame for detecting objects, implemented in the system of FIG. 1, according to an embodiment of the present invention.

As described below, FIGS. 3-5 show example methods which are variation of the method 20 in FIG. 2.

Another object detection method according to the present invention includes detecting and locating objects in a video sequence using a fixed size window sliding over different sizes of consecutive frames in different time lines of video sequence. Each frame during the same processing period has different frame size. The sequence of different frame sizes is repeatedly used in relation to the corresponding consecutive frames coming in time with one sliding window. FIG. 3 shows another example method 30 for locating objects with a fixed size sliding window 32 (i.e., Window 1 of size a×a) over several different sized consecutive frames 34 (i.e., Frames 1, 2, 3, 4, etc.), according to an embodiment of the present invention. The example method in FIG. 3 is similar to the previous example method in FIG. 2. Main difference from the example in FIG. 2 is that the sizes of input frames vary in FIG. 3 as time goes on while the sliding window size remains the same for different frames.

At a first stage, the first frame (i.e., Frame 1) is downsampled from its original and scanned by Window 1 (FIG. 3). It is noted that the scale of downsizing of a frame depends on the object definitions and application. Next, measurements are determined and evaluated for locating objects of interest (as described). Advantages of this approach are that a sliding window covers all scales of objects of interest, and speeds up the process since each stage information can be used at the next stage as exclusive information as described above. The exclusive information does not need to be processed any further.

Another object detection method according to the present invention includes detecting and locating objects in a video sequence using the first frame in processing period with different size windows. The rest of frames in the processing period are replaced with the first frame. FIG. 4 shows another example method 40 for locating objects with a different size sliding windows 42 (i.e., Windows 1, 2, 3, 4, etc.) over several consecutive frames 44 (i.e., Frames 1, 5, etc.) of same size, according to an embodiment of the present invention. The steps of the method 40 in FIG. 4 are similar to the steps of the method 20 in FIG. 2 described above, except that the method 40 in FIG. 4 uses the same frame during process period. For example, in FIG. 4, a process period includes four same frames which are selected as a first frame of coming frames in a sequence. A processing period is the number of frames input to the process to locate the objects of interest. This approach is based on the fact that the contents of neighboring frames are very similar, and each frame can be replaced with a neighboring frame. This can save processing time especially in MPEG sequences. In FIG. 4, after the process period, the Frame 1 and the Window 1 are replaced with a Frame 5 and a Window 1 (i.e., processing procedures are repeated with a process period with different frames but same sliding windows in consequential order).

Another object detection method according to the present invention includes detecting and locating objects in a video sequence using a sliding window with the different sizes of the first frame in the processing period. The rest of the frames in the processing period are replaced and resized according to the time line they reside in. FIG. 5 shows another example method 50 for locating objects with a fixed size sliding window 52 (i.e., Window 1 of size a×a) over several different sized consecutive frames 54 (i.e., Frames 1, 5, etc.), according to an embodiment of the present invention. FIG. 5 shows an alternative to the approach described in FIG. 2. For example, the second, the third and the fourth frames in FIG. 3 can be replaced with the first frame of a coming sequence of frames, with corresponding frame sizes as the approach explained in FIG. 4. In the method 50 of FIG. 5, a sliding window 52 is used and the first frame for the next period is the downsized fifth frame in a sequence. The processing period is a process unit including several frames in a sequence that is used to find the objects using those frames.

Figure 6:
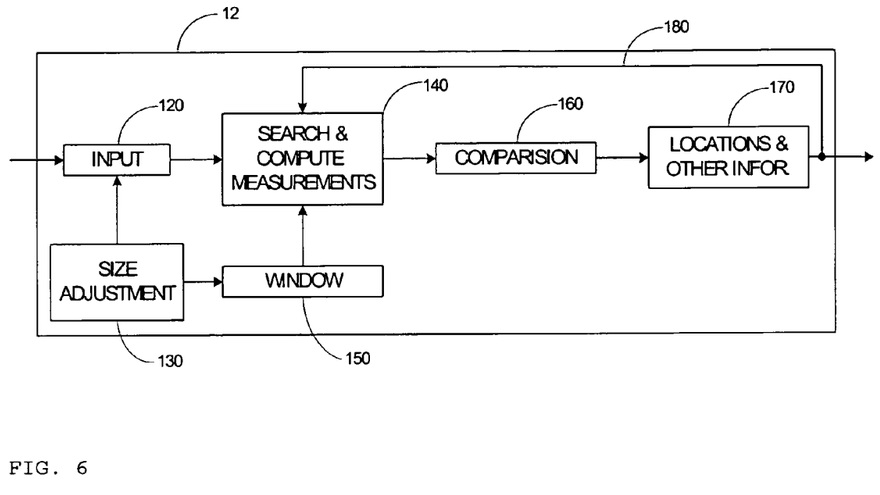
FIG. 6 shows a more detailed functional block diagram of an embodiment of the object detection unit of FIG. 1, according to an embodiment of the present invention.

FIG. 6 shows more detailed block diagram for the example object detection block 12 of FIG. 1, which implements the above steps, according to an embodiment of the present invention. Referring to FIG. 6, the object detection block 12 includes an input 120, a size adjustment unit 130, a search and computation of measurements unit 140, a window unit 150, a comparison unit 160, locations and other information block of object unit 170, and a feed back loop 180.

The input and window sizes are adjusted by size adjustment unit 130 for searching and computing the measurements by unit 140 for object detections. The window unit 150 indicates a window that varies according to the way of processing described with FIGS. 2-5, described earlier. Further, the computed measurements in the measurements unit 140 are compared by the comparison unit 160 with the measurements which are pre-described for the objects of interest. After verifying if there is an object of interest in the windowed area in the given input 120, the information about the locations and others such as shape, if any, is stored in the unit 170. The obtained information can be used as previous information for the next input during a processing period through a feedback 180. The previously obtained information is used for searching and computing process in the unit 140 such that the sliding window is not searching the location obtained previously since the difference between inputs (frames) during the processing period is very small.

The Applications unit 14 in FIG. 1 uses the information obtained from the object detection unit 12 and performs its own algorithms (e.g., object identification, object recognition, etc.).

Figure 7:
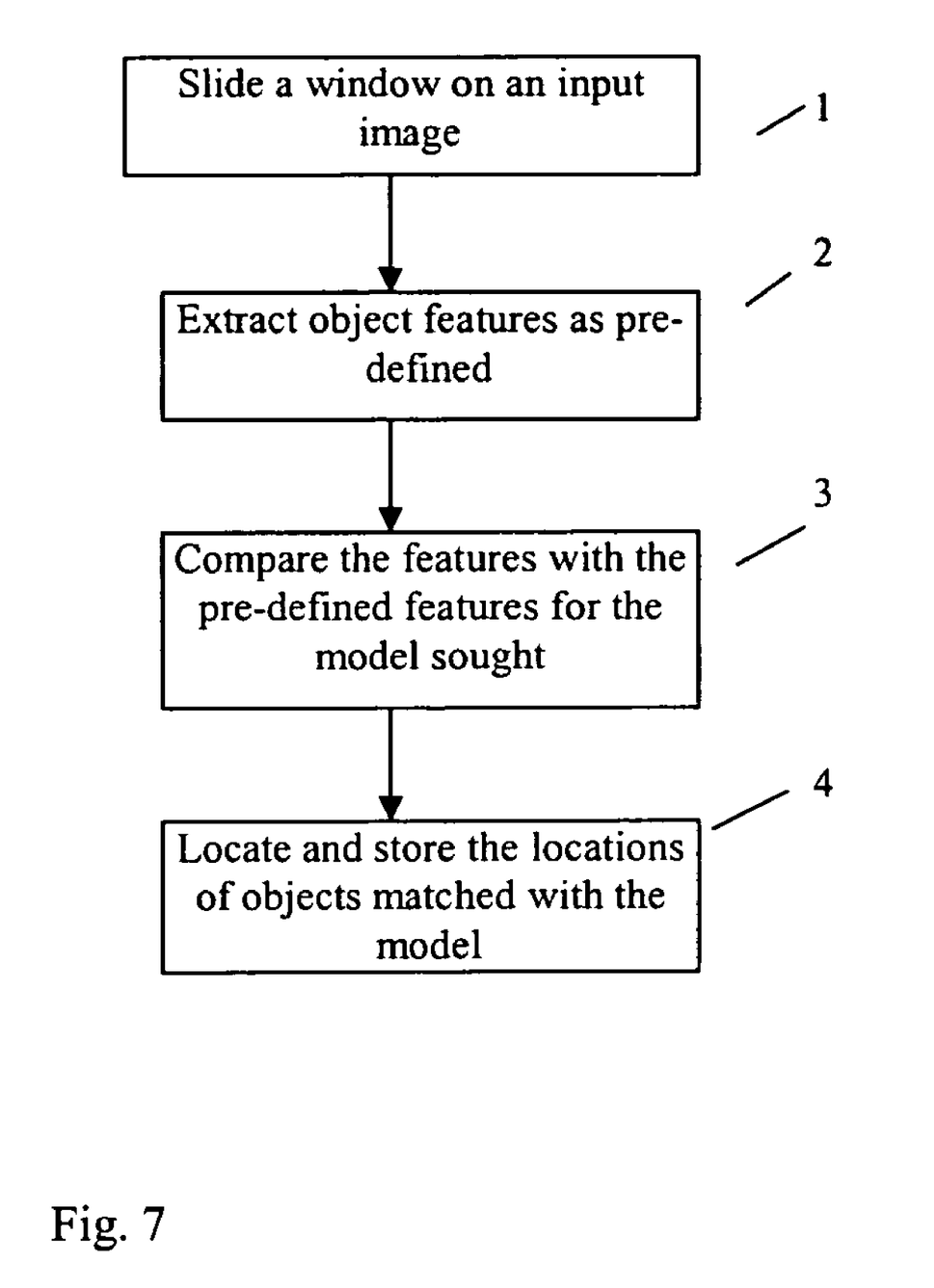
FIG. 7 shows a flowchart of example steps implemented by the object detection block in FIG. 6, according to an embodiment of the present invention.

FIG. 7 shows a general flowchart of example steps implemented by the object detection block 12 in FIGS. 1 and 6, according to an embodiment of the present invention. The detection block 12 implements the process to detect objects of interest. First a flexible sized window (as explained) slides on each incoming image consequentially (step 1). It is noted that the size of input images can also be flexible size. Next object features that have been pre-defined are extracted (step 2). Further, the extracted features are compared with the features of the original model of interest (step 3). Then, the location, if any, is located, stored, and updated for the next processing (step 4).

While the present provisional invention is susceptible of embodiments in many different forms, there are shown in the drawings and herein described in detail, preferred embodiments of the invention with the understanding that this description is to be considered as an exemplification of the principles of the invention and is not intended to limit the broad aspects of the invention to the embodiments illustrated. The aforementioned example architectures above according to the present invention can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for detecting objects in a video sequence of image frames, comprising:
    for a first frame, detecting objects by:
        employing a processor for searching a region in a first frame for a desired object using a sliding window during a processing period, wherein a ratio of the size of the sliding window to the size of the first frame comprises a first size ratio;
        obtaining measurements in the sliding window based on object definitions;
        comparing the measurements with pre-defined values for the desired object to determine if the current windowed region includes the desired object;
    for a second frame, detecting objects by:
        employing a processor for searching a region in a second frame for a desired object using the sliding window during a processing period, wherein a ratio of the size of the sliding window to the size of the second frame comprises a second size ratio;
        obtaining measurements in the sliding window based on object definitions;
        comparing the measurements with pre-defined values for the desired object to determine if the current windowed region includes the desired object; and,
    wherein the first size ratio differs from the second size ratio.

2. The method of claim 1, wherein the size of the sliding window used for the first frame and the second frame during said processing period is the same.

3. The method of claim 1, wherein the size of the sliding window used for the first frame and the second frame during said processing period is different.

4. The method of claim 1, further comprising:
    performing a plurality of searches on frames in a sequence of frames using a sliding window, wherein the ratio of the size of the sliding window to the size of the frame being searched varies in successive searches.

5. The method of claim 1, wherein the first frame and the second frame in said processing period are of the same size.

6. The method of claim 1, wherein the first frame and the second frame in said processing period are of difference sizes.

7. The method of claim 1, further comprising:
    detecting objects in the first frame, if the windowed region includes the desired object, then storing current region information; and,
    detecting objects in the second frame, if the windowed region includes the desired object, then storing current region information.

8. The method of claim 7 further comprising: using said stored region information for detecting objects in the second frame.

9. The method of claim 7 further comprising:
    detecting objects in the second frame by using prior stored region information to avoid searching in said second frame the location of the object found in the first frame.

10. The method of claim 1 wherein the sliding window slides along a pre-defined scan-line direction in an image.

11. A system for detecting objects in a video sequence of image frames, comprising:
    a searching unit that searches a region in a frame in a sequence of frames for a desired object using a sliding window during a processing period;
    a measuring unit that obtains measurements in the sliding window based on object definitions;
    a comparison unit that compares the measurements with pre-defined values for the desired object to determine if the current windowed region includes the desired object; and,
    a size adjustment unit configured to adjust the size of the sliding window and the size of the frame.

12. The system of claim 11, wherein the same size sliding window is used for each frame in the sequence during said processing period.

13. The system of claim 11, wherein the size adjustment unit selects a different size sliding window for each frame in the sequence during said processing period.

14. The system of claim 11, wherein the size adjustment unit increases the sliding window size for each frame in the sequence during said processing period.

15. The system of claim 11, wherein frames in the sequence in said processing period are of the same size.

16. The system of claim 11, wherein frames in the sequence in said processing period are of the different sizes.

17. The system of claim 11, further comprising:
    a storing unit such that if the windowed region includes the desired object, then the storing unit stores the current region information.

18. The system of claim 17 wherein the searching unit uses said stored region information for performing searching for the next frame.

19. The system of claim 17 wherein for searching a next frame in the sequence, the searching unit uses said prior stored region information to avoid searching in said next frame the location of the object found in a previous frame.

20. The system of claim 17 wherein the sliding window slides along a pre-defined scan-line direction in an image.

* * * * *